United States Patent [19]

Bordelon et al.

[11] 4,398,972

[45] Aug. 16, 1983

[54] FERRITIC FE-NI MAGNETIC ALLOYS

[75] Inventors: Chester M. Bordelon, Shreveport, La.; Gilbert Y. Chin, Berkeley Heights, N.J.; Sungho Jin, Meyersville, N.J.; Richard C. Sherwood, New Providence, N.J.; Jack H. Wernick, Madison, N.J.

[73] Assignee: Bell Telephone Laboratories, Incorporated, Murray Hill, N.J.

[21] Appl. No.: 262,602

[22] Filed: May 11, 1981

[51] Int. Cl.[3] .............................................. C04B 35/00

[52] U.S. Cl. .............................. 148/31.55; 75/123 K; 179/117; 179/120

[58] Field of Search ............ 179/117, 120; 75/123 K; 148/31.55

[56] References Cited

U.S. PATENT DOCUMENTS

| | | | |
|---|---|---|---|
| 1,855,816 | 4/1932 | Andres | 179/117 |
| 3,549,830 | 12/1970 | Hofman | 179/117 |
| 3,574,003 | 4/1971 | Nara et al. | 148/120 |
| 4,075,437 | 2/1978 | Chin et al. | 179/120 |
| 4,327,257 | 4/1982 | Schwartz | 179/115.5 R |

OTHER PUBLICATIONS

Magnetism and Metallurgy of Soft Magnetic Materials, North-Holland Pub. Co. (1977) pp. 267-268.

Constitution of Binary Alloys, 2nd ed. McGraw-Hill Book Co. (1958) pp. 667-684, Hansen.

Ferromagnetism Materials, vol. 2, E. P. Wohlfarth ed., North-Holland Pub. Co. (1980) pp. 123-168.

Ferromagnetism, Van Nostrand (1951) pp. 102-119.

Bell System Technical Journal, vol. 30, pp. 110-140, (1951).

*Primary Examiner*—John P. Sheehan

*Attorney, Agent, or Firm*—Eugen E. Pacher; Richard D. Laumann

[57] ABSTRACT

Disclosed are magnetically soft ferritic multiphase Fe-Ni alloys having a Ni content in the range of about 4 to about 16 weight percent, devices containing a body fabricated from such alloys, and method for heat treating such body. Appropriate heat treatment comprises a low-temperature anneal in the two-phase $(\alpha+\gamma)$ region of the Fe-Ni phase diagram, and typically results in improved magnetic properties. In particular, alloys according to the invention having x weight percent of Ni have a maximum permeability $\mu_m$ at least as large as $1.5[25(16-x)^2]$G/Oe. The alloys typically also have a coercive field $H_c$ at most as large as $0.7[0.65(1+0.6x)]$Oe, a saturation induction $B_s$ of at least about 20 kG, a maximum incremental permeability $\Delta\mu$, measured with an applied a.c. field of about 0.005 Oe, of at least about 150 G/Oe, and a yield strength to 0.2 percent offset of at least about 40 $10^3$psi, with all the material properties measured at room temperature. Alloys according to the invention can advantageously be used in devices comprising a magnetically soft body, for instance in electro-acoustic transducers, e.g., in telephone receivers.

26 Claims, 7 Drawing Figures

FERRITIC FE-NI MAGNETIC ALLOYS

TECHNICAL FIELD

The invention pertains to ferretic iron-nickel magnetic alloys and devices comprising such alloys.

BACKGROUND OF THE INVENTION

Magnetically soft materials, i.e., materials which typically exhibit macroscopic ferromagnetism only when a magnetic field is applied, find application in a great variety of technological fields. Exemplary uses are in heavy-current engineering, transductor cores, relays, inductance coils, transformers, and variable reluctance devices. Although many materials are soft magnets, this invention is concerned only with magnetically soft iron-nickel (Fe-Ni) alloys, and in particular, Fe-rich essentially ferritic alloys, and the discussion will be restricted accordingly.

The Fe-Ni alloy system offers a large number of technically important magnetically soft compositions, typically having compositions in the range 30–80 weight percent Ni. See for instance C. W. Chen, *Magnetism and Metallurgy of Soft Magnetic Materials*, North-Holland Publishing Co., 1977, page 389. Alloys in this compositional range have the austenitic (face-centered cubic, fcc) crystal structure. M. Hansen, *Constitution of Binary Alloys*, 2nd ed., McGraw-Hill, (1958), pp. 677–684, incorporated herein by reference.

In Fe-Ni alloys within the compositional range from 0 to about 20 weight percent Ni, the body centered cubic (bcc) lattice configuration prevails, and within the range of from about 20 to about 30 percent Ni, after normal cooling from the $\gamma$-region to room temperature, a two-phase structure containing both a bcc and an fcc phase typically exists.

As a general rule, for soft magnetic materials the final product should be a single-phase solid solution in the equilibrium state, (W. Chen, op. cit. page 267). In agreement with this rule, the above two-phase region, i.e., the region from about 20 to 30 percent Ni, is usually not of magnetic interest. However, alloys near 30 percent Ni in the single-phase fcc region find application as temperature compensators.

In the prior art, Fe-Ni alloys having the compositional range 0 to 20 weight percent Ni have not found significant use, although their properties have been measured and published. See, for instance, R. M. Bozorth, *Ferromagnetism*, Van Nostrand, 1951, especially pp. 102–119, and G. Y. Chin and J. H. Wernick, *Ferromagnetic Materials*, Vol. 2, E. P. Wohlfarth, editor, North-Holland Publishing Co., (1980), especially pp. 123–168. The neglect of alloys in this compositional range can be explained by their technologically relatively unattractive magnetic characteristics, such as, for instance, their relatively low maximum permeability and relatively high coercive force, as exemplified by the prior art data referred to above. However, alloys in this compositional range have low material costs, and furthermore, supplies for Fe and Ni are substantially assured. Thus, Fe-Ni alloys containing less than about 20 weight percent Ni could be of considerable commercial value if their magnetic properties could be sufficiently improved.

An established soft magnetic material, used for instance as a ring armature in telephone receivers, is 2V-Permendur (49 percent Fe, 49 percent Co, 2 percent V). But the high cost and uncertain supply status of Co make development of a Co-free substitute material for this and other high-Co alloys desirable.

SUMMARY OF THE INVENTION

According to the invention, improved magnetically soft Fe-Ni alloys with a Ni content in the range from about 4 to about 16 weight percent, preferably from about 6 to about 12 weight percent, are realized. In particular, the inventive alloys have a maximum permeability $\mu_m$ at least equal to the value given by the expression $1.5[25(16-x)^2]$G/Oe, and typically have a coercive force $H_c$ at most equal to the value given by the expression $0.7[0.65(1+0.6x)]$Oe, with "x" being the weight percent of Ni. Typically, the alloys also exhibit a saturation induction $B_s$ of at least about 20 kG, and a maximum incremental permeability $\Delta\mu$, measured with an applied a.c. field $\Delta H$ of about 0.005 Oe, of at least about 150 G/Oe. Also, the alloys typically exhibit a yield strength to 0.2% offset of at least about $40 \cdot 10^3$ psi.

The inventive alloys are fabricated by a process comprising a low-temperature anneal in the $\alpha+\gamma$ region of the phase diagram, preferably at a temperature within the range defined by the expression $[750-17x]$°C. ±25° C., in which "x" represents weight percent Ni.

The inventive alloys typically contain only Fe, Ni and "steelmaking additives" in individual amounts greater than about 0.5 percent by weight. By "steelmaking additives" we mean those elements that have been added in steelmaking for purposes of de-sulfurization, de-carburization, de-oxidation, and the like, and which may be present in the starting materials for the inventive alloy in a concentration in excess of 0.5 percent by weight, but typically less than about 1 percent by weight. Examples of such elements are Mn, Al, Zr and Si. However, in preferred alloys "steelmaking additives" do not exceed 0.5 percent by weight individually.

Preferred inventive alloys typically do not contain additives and impurities in a combined amount greater than about 1 percent by weight, preferably not greater than 0.5 percent, and individual additives and impurities typically are present only in amounts less than about 0.5 percent by weight, preferably less than 0.2 percent. Carbon, nitrogen, oxygen, sulfur and phosphorus typically are present only in amounts less than 0.1 percent by weight, preferably less than 0.05 percent.

The above combination of advantageous magnetic and mechanical properties permits use of bodies comprising an inventive alloy in device applications. For instance, a body comprising an alloy according to the invention typically can advantageously be incorporated into a device comprising a component whose position is dependent on strength or direction of a magnetic field, and is particularly advantageously incorporated into an electro-acoustic transducer, e.g., into such a transducer contained in a telephone receiver. And alloys according to the invention typically can advantageously be used to replace some high-cost prior art alloys, e,.g., 2V-Permendur, in devices such as telephone receivers.

DETAILED DESCRIPTION

Figure 1:
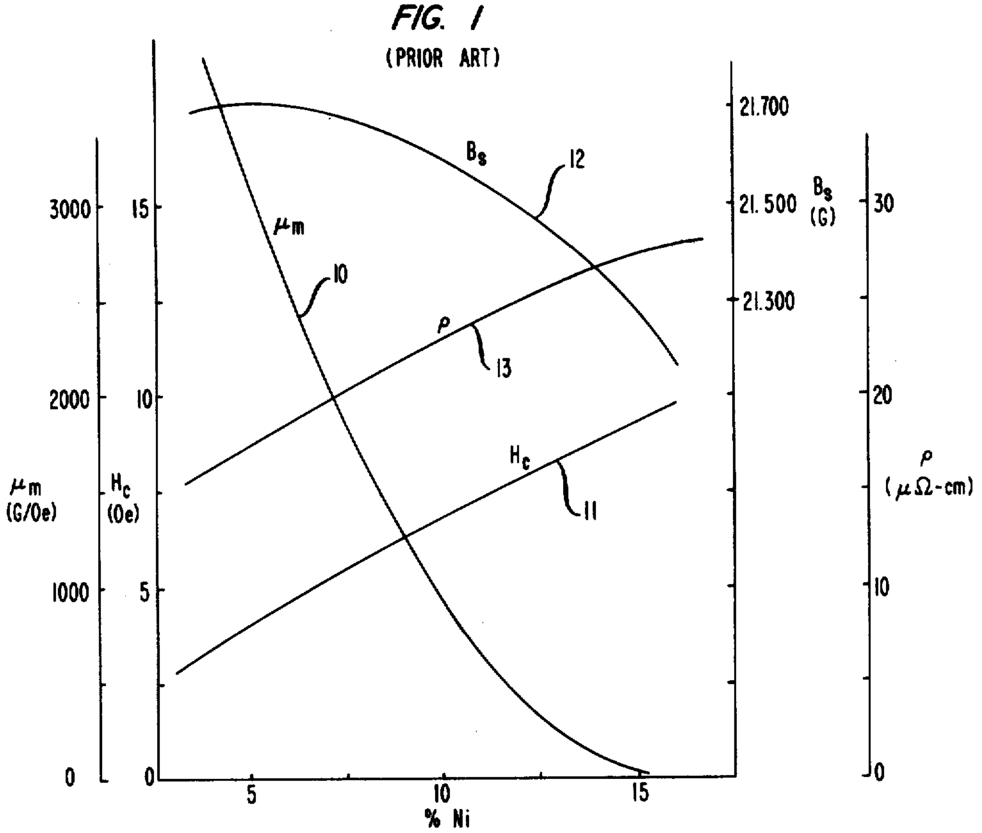
FIG. 1 (PRIOR ART)
FIG. 1 shows maximum permeability, coercive force, saturation induction, and resistivity of prior art alloys having Ni content between about 4 and about 16 weight percent.

Fe-Ni alloys with a Ni content in the range from about 4 to about 16 weight percent can be processed to have improved magnetic properties that typically make such alloys useful as magnetically soft components in devices. In particular, alloys according to the invention have maximum permeability $\mu_m$ that is more than about 50 percent, preferably more than 100 percent, greater than that of prior art Fe-Ni alloys of the same Ni content, and typically have coercive force $H_c$ at least about 30%, preferably 50%, less than that of prior art alloys. Furthermore, the inventive alloys exhibit values of saturation induction $B_s$, incremental permeability $\Delta\mu$, electrical resistivity $\rho$, and yield strength that are similar to, and in the case of $\Delta\mu$, significantly higher than, those of prior art Fe-Ni alloys of the same Ni content. The inventive alloys typically can advantageously be employed in devices comprising a body of a magnetically soft metallic alloy, exemplified by devices comprising a component whose position is dependent on strength or direction of a magnetic field. Among such devices are electro-acoustic transducers, such as, for instance, those used in U-type telephone receivers.

Alloys according to the invention typically do not contain any elements other than Fe and Ni in individual amounts greater than about 0.5 percent by weight, preferably 0.2 percent, except for "steelmaking additves" such as Mn, Al, Zr and Si, as was pointed out above. In preferred alloys "steelmaking additives" also do not exceed 0.5 percent by weight individually. Also, preferred alloys according to the invention typically do not contain additives and impurities in a combined amount greater than about 1 percent by weight, preferably less than 0.5 percent. Examples of elements that can be present either as additives or as impurities are Mn, Al, Zr, Si, Cu, Cr, Co, Mo, Ti, and V. The elements C, N, O, S, and P typically are present as deleterious impurities, and are to be present individually in amounts less than about 0.1 percent by weight, preferably less than 0.05 percent, in order to achieve superior magnetic and mechanical properties.

The inventive alloys typically possess a multi-phase structure, comprising ferritic (bcc, $\alpha$-phase), austenitic (fcc, $\gamma$-phase), and martensitic (bcc, $\alpha'$-phase) constituents. The distribution of phases present in any particular alloy depends on composition and heat treatment. The heat treatment typically comprises a "low temperature" annealing step at a temperature within the $(\alpha+\gamma)$ two-phase region of the Fe-Ni phase diagram. Such treatment typically results in relief of internal stress and in annealing-out of defects, and consequently in slight mechanical softening, as well as in pronounced magnetic "softening". Prolonged heat treatment, however, leads to the formation of an excessive amount of undesirable retained austenite, which results in deterioration of the soft magnetic properties, especially in alloys with higher Ni-content, as will be demonstrated below.

Alloys according to the invention can, for instance, be prepared by vacuum induction-melting of Fe and Ni or their alloys in the appropriate amounts to yield the desired nominal alloy composition, casting ingots from the melt, "soaking" the ingot for an extended period at elevated temperature, for instance at about 1250° C. for about 4 hours, followed by an appropriate hot-forming operation and air cooling. The resulting material is then typically further processed to yield a component of the desired shape. The metal forming steps typically are followed by heat treatment, which typically comprises an extended anneal at a temperature in the $\gamma$-region of the Fe-Ni phase diagram, e.g., about 2 hours at about 1000° C., carried out in a protective atmosphere, e.g., in $H_2$, followed by an air cool. This in turn is typically followed by the above-described "low-temperature" heat treatment in the two-phase region of the phase diagram, which is typically also carried out in a protective atmosphere, e.g., in Ar, $H_2$, or $N_2$.

It will be understood that the details of the heat treatment can be varied, provided the treatment results in a relatively strain- and defect-free multi-phase material that does not contain excessive amounts of retained austenite.

Although annealing at substantially any temperature within the $(\alpha+\gamma)$-region of the phase diagram will result in decreased internal stress and in a reduced concentration of defects, a preferred temperature range for the low temperature heat treating step is given by the following expression:

$$\text{heat treatment tempeature} \sim [750-17x]°\text{C.} \pm 25°\text{ C.}$$

In this expression, as well as elsewhere in this application, "x" represents the weight percent Ni. The "low-temperature" heat treatment time yielding, for instance, maximum $\mu_m$ is typically dependent on temperature and on alloy composition, as will be shown below. Establishment of the appropriate heat treatment time thus typically requires a minor amount of experimentation.

FIG. 1 shows typical prior art values of maximum permeability $\mu_m$ as curve 10, coercive force $H_c$ as curve 11, saturation induction $B_s$ as curve 12, and electrical resistivity $\rho$ as curve 13, as a function of Ni content. Over the compositional range of interest to this invention, i.e., for about 4–16 weight percent Ni, the prior art values of $\mu_m$ can be approximated by the expression $25(15-x)^2$ G/Oe, and of $H_c$ by the expression $0.65(1+0.6x)$Oe. These as well as all other values of magnetic and mechanical properties cited herein are understood to be room-temperature values.

Alloys according to the invention have substantially improved maximum permeability and coercive field over prior art alloys, $\mu_m$ having typically increased by at least about 50 percent, preferably 100 percent, and $H_c$ being typically decreased by at least about 30%, preferably at least about 50%. Inventive alloys therefore have $\mu_m$ at least equal to the value given by the expression $1.5[25(16-x)^2]$G/Oe, preferably $2[25(16-x)^2]$G/Oe, and $H_c$ at most equal to the value of the expression $0.7[0.65(1+0.6x)]$Oe, preferably $0.5[0.65(1+0.6x)]$Oe. Furthermore, such alloys exhibit a saturation induction $B_s$ of at least about 20 kG, a maximum incremental permeability $\Delta\mu$ of at least about 150 G/Oe, preferably 200 G/Oe, when measured with an applied a.c. magnetic field of about 0.005 Oe, and a yield strength of 0.2 percent offset of at least about $40 \cdot 10^3$ psi.

As had been stated above, alloys according to the invention comprise about 4–16 percent by weight of Ni, with the preferred range being from about 6 percent to about 12 percent. The lower limit is dictated by strength and resistivity considerations, since heat-treated Fe-Ni alloys containing less than about 4 percent Ni typically are too soft and have too low resistivity for device applications. The upper limit of Ni content is dictated by coercive field and permeability considerations, since in Fe-Ni alloys containing more than about 16 percent Ni typically $H_c$ is too large and $\mu_m$ and $\Delta\mu$ too small for device applications requiring a magnetically soft material. The range from 6–12 percent by weight of Ni typically offers the most advantageous combination of magnetic and mechanical properties, and is therefore preferred.

Figure 2:
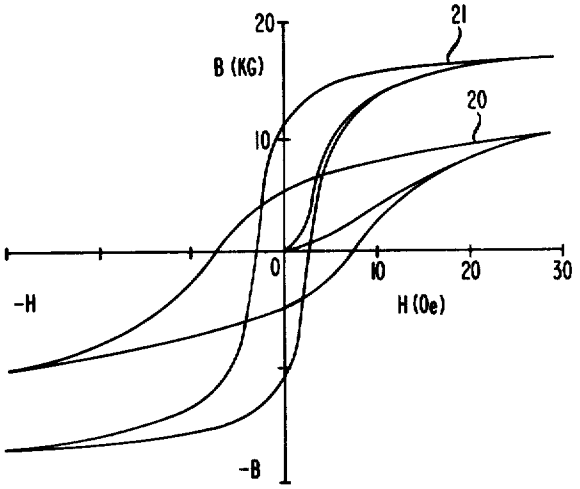
FIG. 2 shows B-H loops of a Fe-12Ni alloy according to the invention.

FIG. 2 illustrates some aspects of the changes that take place in the magnetic properties of alloys according to the invention when subjected to various heat treatments, namely, the figure shows B-H loops of samples of Fe-12Ni (i.e., an Fe-Ni alloy containing nominally 12 percent by weight of Ni). Curve 20 of FIG. 2 is obtained with a sample that was annealed at about 1000 degrees C. (i.e., in the $\gamma$-region of the phase diagram) for about 2 hours, followed by an air cool. The resulting martensitic structure is found to have a high density of dislocations and point defects, a fine substructure, and internal stress due to the rapid change in crystal structure without significant long-range diffusion. These structural features result in magnetic properties that make the sample typically unsuitable for applications requiring a magnetically soft material, as is revealed by the skewed B-H loop. In particular, the sample has a relatively large $H_c$, relatively small B, e.g., $B_{25}$ (i.e., B at H=25 Oe), and relatively small $\mu_m$ and $\Delta\mu$. Curve 21 of FIG. 2 is obtained after heat-treatment of a martensitic sample within the low-temperature $(\alpha+\gamma)$ two-phase region, namely at about 550 degrees C. for about 2 hours. Although such heat treatment typically results in decomposition of the alloy into a multi-phase structure (e.g., $\alpha+\gamma+\alpha'$), it results in significantly improved magnetic properties, e.g., decreased $H_c$ and increased B, $\mu_m$, and $\Delta\mu$.

Figure 3:
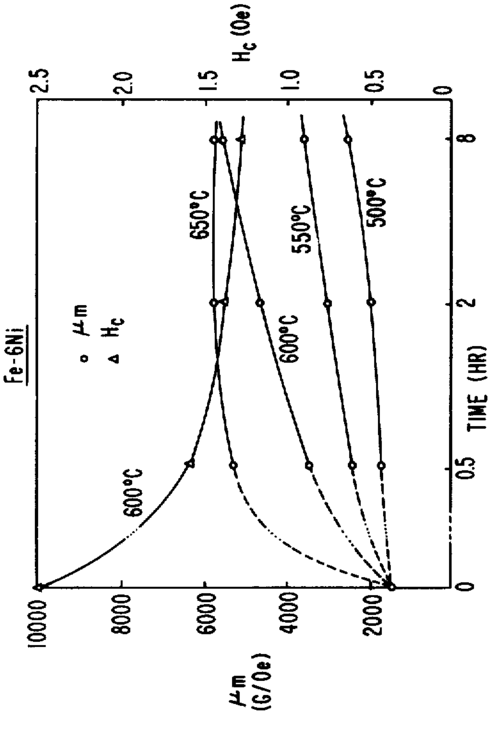
FIGS. 3 and 4 show maximum permeability and coercive force of a Fe-6-Ni alloy and a Fe-12Ni alloy, respectively, as a function of heat treating time and temperature.
Figure 4:
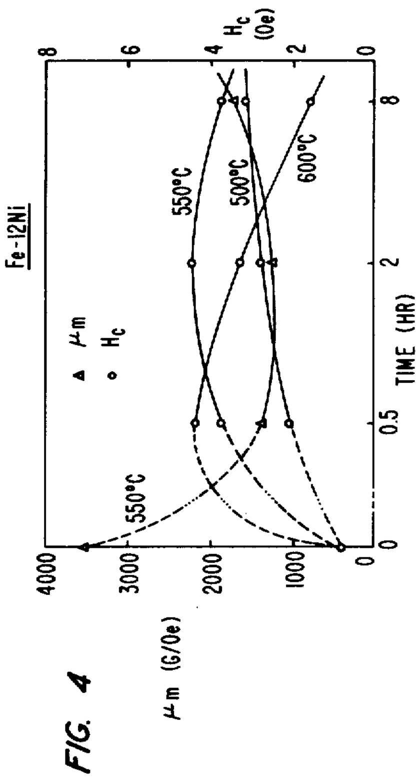

FIGS. 3 and 4 exemplify the dependence of magnetic properties, in particular of $\mu_m$ and $H_c$, on heat treating time and temperature, for samples of Fe-6Ni (FIG. 3) and of Fe-12Ni alloys (FIG. 4). Both alloys show a rapid initial increase in $\mu_m$ and decrease in $H_c$, with the rate of change increasing both with temperature and with Ni content. But whereas Fe-6Ni samples do not show any "reversion" (i.e., excessive retained austenite formation) after 8 hours at temperatures up to 650 degrees C., Fe-12Ni samples show reversion for times greater than about 0.5 hours and 2 hours at 600 degrees C. and 550 degrees C., respectively, demonstrating that typically the annealing and transformation rates increase with both temperature and Ni content.

Figure 5:
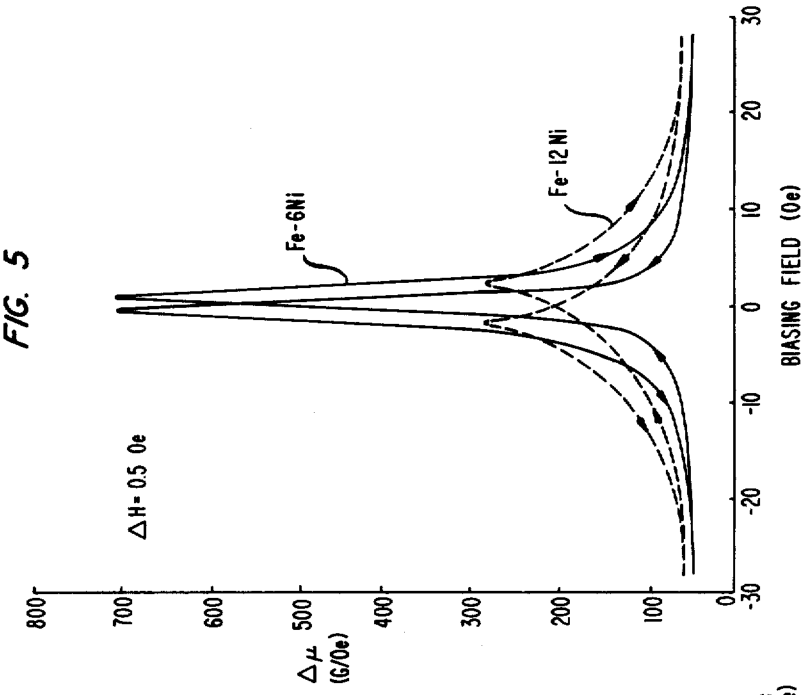
FIGS. 5 and 6 present data on the incremental permeability of 2 alloy compositions according to the invention as a function of biasing field.
Figure 6:
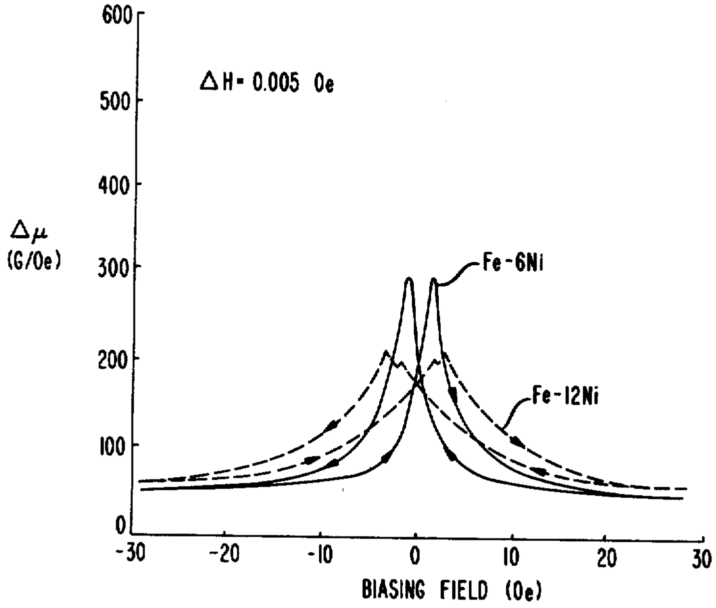

FIGS. 5 and 6 show the incremental permeabilities $\Delta\mu$ of samples of Fe-6Ni (heat treated at 1000 degrees C. for 2 hours and at 650 degrees C. for 30 minutes) and of Fe-12Ni (1000 degrees C./2 hours and 550 degrees C./2 hours), as a function of biasing field. The amplitude of the a.c. measuring field, referred to as $\Delta H$, is 0.5 Oe and 0.005 Oe for FIGS. 5 and 6, respectively. The maximum incremental permeability decreases both with increasing Ni content and with decreasing $\Delta H$.

Figure 7:
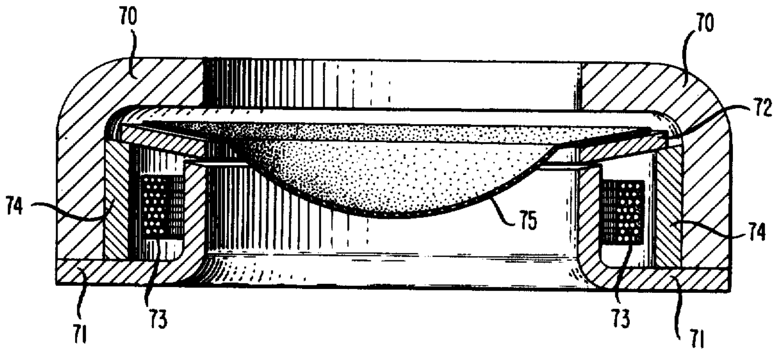
FIG. 7 schematically illustrates in cross-sectional view a device comprising a magnetic body according to the invention. In particular, it illustrates a U-type telephone receiver.

FIG. 7 schematically shows in cross-section an example of a device that comprises a component whose position is dependent on the strength or direction of a magnetic field. In particular, the figure represents an electro-acoustic transducer, and still more particularly, a U-type ring-armature telephone receiver, as described for instance by E. E. Mott and R. C. Miner, *Bell System Technical Journal*, Vol. 30, pp. 110–140 (1951). Permanent magnet 70, for example a Fe-Cr-Co magnet, provides a biasing field in the air gap formed between pole piece 71, which, for example, can be a body comprising a Fe-45Ni alloy, and one pole of 70. Armature ring 72, typically comprising a magnetically soft alloy such as, for instance, 2V-Permendur in a prior art device, or an Fe-Ni alloy according to the invention, rests on nonmagnetic support 74, and can be subjected to a time-varying magnetic field by means of electrical induction coil 73. The position of the armature in the air gap is a function of the strength and direction of the time-varying magnetic field, resulting in movement of the armature and of diaphragm 75, attached to the armature, thereby creating acoustic waves in a surrounding fluid medium, e.g., in air. Alloys useful as armatures in telephone receivers must have a large $\mu_m$, large $\Delta\mu$ at a high induction, and suitable mechanical properties, namely high yield strength, and alloys according to the invention typically do possess these properties.

In addition to advantageous magnetic properties and high yield strength, alloys according to the invention and bodies produced therefrom also have other useful mechanical properties. In particular, they are typically ductile, and are easy to process since they do not have critical processing steps and are not subject to pronounced work hardening during deformation.

In Table 1 we present data on yield strength of Fe-Ni alloys with and without low-temperature heat treatment. The data shows that the anneal in the two-phase region results in a relatively minor decrease in yield strength.

TABLE 1

YIELD STRENGTH OF FERRITIC FE—NI ALLOYS

| Material | Heat Treatment | Yield Strength (0.2% offset) |
|---|---|---|
| Fe—6Ni | 1000° C./2 hrs. | $48 \cdot 10^3$psi |
| Fe—6Ni | 1000° C./2 hrs. + 650° C./30 min. | $45 \cdot 10^3$psi |
| Fe—12Ni | 1000° C./2 hrs. | $75 \cdot 10^3$psi |
| Fe—12Ni | 1000° C./2 hrs. + 550° C./2 hrs. | $72 \cdot 10^3$psi |

In Table 2 we present typical magnetic data and the room-temperature resistivity for two compositions of inventive alloys. A typical heat treatment for the Fe-6Ni samples is 1000° C./2 hours+650° C./30 minutes, and for the Fe-12Ni samples is 1000° C./2 hours+550° C./2 hours.

TABLE 2

TYPICAL MAGNETIC PROPERTIES AND RESISTIVITY OF FERRITIC FE—NI ALLOYS

| Material | $\mu_m$ (G/Oe) | $H_c$ (Oe) | $B_s$ (kG) | $\rho$ ($\mu\Omega$-cm) | max · $\Delta\mu$ (G/Oe) ($\Delta H$ = 0.005 Oe) |
|---|---|---|---|---|---|
| Fe—6Ni | 6000 | 1.2 | 21 | 20 | 285 |
| Fe—12Ni | 2000 | 2.7 | 21 | 25 | 215 |

And in Table 3 we represent exemplary measurement results on armature rings made from inventive alloys.

TABLE 3

| MAGNETIC PROPERTIES OF FERRITIC FE—NI ALLOYS | | | | | |
|---|---|---|---|---|---|
| Material | $H_c$ (Oe) | $B_{25}$ (kG) | $\mu_m$ (G/Oe) | ΔH(Oe) | max · Δμ (G/Oe) |
| Fe—6Ni, | 1.3 | 17 | 2500 | 0.5 | 621 |
| 1100° C./4 hrs. + | | | | 0.05 | 350 |
| 530° C./2 hrs/$H_2$ | | | | 0.005 | 284 |
| Fe—6Ni, | 1.3 | 16.8 | 4255 | 0.5 | 737 |
| 1000° C./2 hrs. + | | | | 0.05 | 399 |
| 650° C./30 min./Ar | | | | 0.005 | 291 |
| Fe—12Ni, | 2.9 | 15.7 | 1538 | 0.5 | 266 |
| 1100° C./4 hrs. + | | | | 0.05 | 216 |
| 530° C./2 hrs./$H_2$ | | | | 0.005 | 205 |

In the first column of Table 3 are listed the alloy compositions, the annealing times and temperatures, and the times, temperatures, and protective gas used for the low-temperature two-phase anneal. "$B_{25}$" refers to the magnetic induction measured with an applied field of 25 Oe.

As can be seen from the data presented in Table 3, the details of the heat treatment, especially of the low-temperature treatment, typically have a substantial effect on the magnetic properties of the alloys, especially on $\mu_m$. For instance, the first-listed Fe-6Ni sample shows a low $\mu_m$ because the heat treatment time and temperature were insufficient, as can also be verified from FIG. 3. Thus, it is typically necessary to establish, for instance by measurements such as those that lead to the data shown in FIGS. 3 and 4, the relationship between alloy composition, annealing temperature and time, and the relevant magnetic properties. However, heat treatment of alloys according to the invention is not limited to the exemplary sequences and conditions disclosed above, and variations thereon will be obvious to those skilled in the art.

What is claimed is:

1. Device comprising a body of a magnetically soft Fe-Ni alloy, characterized in that the alloy has
   (a) a Ni content in the range of about 4 to a value less than about 16 weight percent and a multiphase structure and
   (b) a maximum permeability $\mu_m$ at least as large as the value given by the expression $1.5[25(16-x)^2]$G/Oe, where "x" is equal to the weight percent of Ni.

2. Device comprising a component whose position is dependent on strength or direction of a magnetic field, the component comprising a body of a magnetically soft Fe-Ni alloy, characterized in that the alloy has
   (a) a Ni content in the range of about 4 to a value less than about 16 weight percent and a multiphase structure and
   (b) a maximum permeability $\mu_m$ at least as large as the value given by the expression $1.5[25(16-x)^2]$G/Oe, where "x" is equal to the weight percent of Ni.

3. Device according to claim 1 or 2, wherein the alloy has a coercive force $H_c$ at most as large as the value given by the expression $0.7[0.65(1+0.6x)]$Oe.

4. Device according to claim 3, wherein the alloy has a maximum incremental permeability Δμ, measured with an applied a.c. field ΔH of about 0.005 Oe, of at least about 150 G/Oe.

5. Device according to claim 4, wherein the alloy has a saturation induction $B_s$ of at least about 20 kG.

6. Device according to claim 5, wherein the alloy has a yield strength to 0.2 percent of at least about $40 \cdot 10^3$ psi.

7. Device according to claim 6, wherein the alloy has a maximum permeability $\mu_m$ at least as large as the value given by the expression $2[25(16-x)^2]$G/Oe, and a coercive force $H_c$ at most as large as the value given by the expression $0.5[0.65(1+0.6x)]$Oe.

8. Device according to claim 1 or 2, wherein the alloy comprises at least about 99 percent by weight Fe and Ni.

9. Device according to claim 8, wherein no element other than Fe and Ni is present in the alloy in an amount greater than about 0.5 percent by weight.

10. Device according to claim 1 or 2 wherein the alloy contains no element of the group consisting of C, N, O, S, and P in an amount greater than about 0.1 percent by weight.

11. Device according to claim 1 or 2, wherein the alloy has a Ni content in the range of about 6 to about 12 weight percent.

12. Device according to claim 2, wherein the magnetic field is produced by an electrical induction coil.

13. Device according to claim 2, wherein the device as an electro-acoustic transducer.

14. Device according to claim 13, wherein the transducer is a telephone receiver.

15. Magnetically soft Fe-Ni alloy having a Ni content in the range or about 4 to a value less than about 16 weight percent and a multiphase structure, characterized in that the alloy has a maximum permeability $\mu_m$ at least as large as the value given by the expression $1.5[25(16-x)^2]$G/Oe, where "x" is equal to the weight percent of Ni.

16. Magnetically soft Fe-Ni alloy having a Ni content in the range of about 6 to about 12 weight percent and a multiphase structure, characterized in that the alloy has
   (a) a maximum permeability $\mu_m$ at least as large as the value given by the expression $2[25(16-x)^2]$G/Oe,
   (b) a coercive force $H_c$ at most as large as the value given by the expression $0.5[0.66(1+0.6x)]$Oe,
   (c) a maximum incremental permeability Δμ, measured with an applied a.c. field ΔH of about 0.005 Oe, of at least about 200 G/Oe,
   (d) a saturation induction $B_s$ of at least about 20 kG,
   (e) a yield strength to 0.2 percent offset of at least about $40 \cdot 10^3$ psi, and furthermore,
   (f) the alloy comprises at least about 99 percent by weight Fe and Ni, with no element other than Fe and Ni being present in an amount greater than about 0.5 percent by weight, and
   (g) the alloy contains no element of the group consisting of C, N, O, S, and P in an amount greater than about 0.1 percent by weight.

17. Alloy according to claim 15, wherein the alloy has a coercive force $H_c$ at most as large as the value given by the expression $0.7[0.65(1+0.6x)]$Oe.

18. Alloy according to claim 17, wherein the alloy has a maximum incremental permeability Δμ, measured with an applied a.c. field ΔH of about 0.005 Oe, of at least about 150 G/Oe.

19. Alloy according to claim 18, wherein the alloy has a saturation induction $B_s$ of at least about 20 kG.

20. Alloy according to claim 19, wherein the alloy has a yield strength to 0.2 percent offset of at least about $40 \cdot 10^3$ psi.

21. Alloy according to claim 20, wherein the alloy has a maximum permeability $\mu_m$ at least as large as the value given by the expression $2[25(16-x)^2]$G/Oe, and a coercive force $H_c$ at most as large as the value given by the expression $0.5[0.65(1+0.6x)]$Oe.

22. Alloy according to claim 15, wherein the alloy comprises at least about 99 percent by weight Fe and Ni.

23. Alloy according to claim 22, wherein no element other than Fe and Ni is present in the alloy in an amount greater than about 0.5 percent by weight.

24. Alloy according to claim 15, wherein the alloy contains no elements of the group consisting of C, N, O, S, and P in an amount greater than about 0.1 percent by weight.

25. Alloy according to claim 15, wherein the alloy has a Ni content in the range of about 6 to about 12 weight percent.

26. A telephone receiver comprising a component whose position is dependent on strength or direction of a magnetic field, the component comprising a body of a magnetically soft Fe-Ni alloy, characterized in that the alloy has (a) a Ni content in the range of about 6 to about 12 weight percent and a multiphase structure,
(b) a maximum permeability $\mu_m$ at least as large as the value given by the expression $2[25(16-x)^2]$G/Oe,
(c) a coercive force $H_c$ at most as large as the value given by the expression $0.5[0.65(1+0.6x)]$Oe,
(d) a maximum incremental permeability $\Delta\mu$, measured with an applied a.c. field of about 0.005 Oe, of at least about 200 G/Oe,
(e) a saturation induction $B_s$ of at least about 20 kG,
(f) a yield strength of 0.2 percent offset of at least about $40\cdot10^3$ psi, and furthermore,
(g) the alloy comprises at least about 99 percent by weight Fe and Ni, with no elemental other than Fe and Ni being present in an amount greater than about 0.5 percent by weight, and
(h) the alloy contains no element of the group consisting of C, N, O, S, and P in an amount greater than about 0.1 percent by weight.

* * * * *